Feb. 19, 1952     R. B. HOUSLEY     2,586,659
SHARPENING DEVICE FOR LAWN MOWERS
Filed July 17, 1951
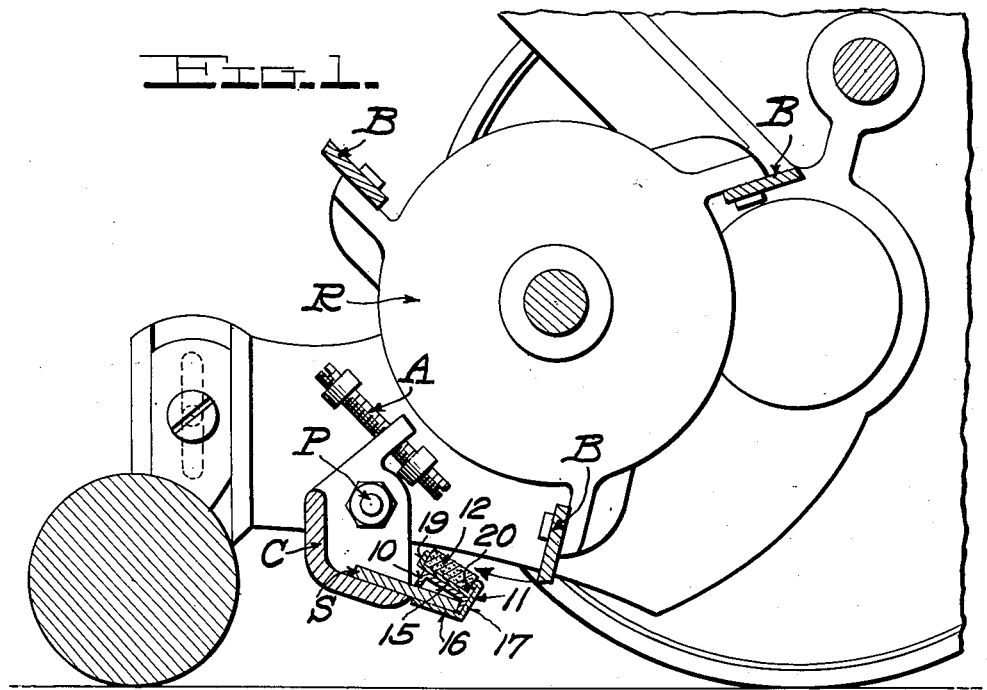
INVENTOR
R B. HOUSLEY,
BY H.B.Willson&Co.
ATTORNEY Patented Feb. 19, 1952

2,586,659

UNITED STATES PATENT OFFICE 2,586,659

SHARPENING DEVICE FOR LAWN MOWERS

Robert B. Housley, Venice, Calif., assignor of one-half to Evelyn C. Housley, Venice, one-fourth to George Arnold, Santa Monica, and one-fourth to Alfred L. Arnold, Venice, Calif.

Application July 17, 1951, Serial No. 237,175

5 Claims. (Cl. 51—250)

My invention relates to lawn mower sharpeners of the type in which a sharpening device is attached to the stationary cutter for engagement by the edges of the rotary cutter blades on the reel to sharpen the same. In order to apply most of the sharpening attachment of this character, it is necessary to adjust the stationary cutter bar or blade away from the reel, but the construction of practically all of the reel type lawn mowers now on the market is such that the stationary cutter has a very limited range of adjustment and in many machines it can be moved away from the reel blades only about three-sixteenths of an inch. That leaves very little space for the insertion and mounting of a reel blade sharpener on the stationary cutter.

The principal object of this invention is to provide an improved sharpening device of this character which may be used on practically all of the present day reel type mowers and which may be repeatedly used from time to time without renewing the abrading element.

Another object of the invention is to provide a sharpening device composed of two separable sections which extend the full length of the stationary cutter and which are successively applied, thereby greatly facilitating the application of the device in the limited space available.

Another object is to provide a sectional device embodying an outer section carrying the abrasive block or element and having spring means to frictionally retain the device on the stationary cutter, and an inner section to give the abrasive element the proper cutting pitch or angle since the stationary cutting blades on most lawn mowers are of rectangular shape in cross section.

Another object is to provide a sharpener of the above indicated character in which the abrasive element is in the form of a thin rectangular strip or bar of molded composition containing emery or Carborundum, the element being set in a metal casing which strengthens and protects it and which may serve as a mold for it.

Another object is to provide a device of the above indicated character which is relatively inexpensive to produce, which may be quickly applied and removed and which will be highly effective in use.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a vertical front to rear sectional view through portions of a common form of reel type lawn mower showing the application of the improved sharpener;

Fig. 2 is a perspective view of a portion of the outer or clamping section which carries the abrasive element;

Fig. 3 is a perspective view of a portion of the inner section of the device.

Referring to Fig. 1 of the drawing the letter R denotes the usual rotary reel carrying the curved cutter blades B which normally coact with the stationary cutter blade S in the grass cutting operation. The rectangular blade S is suitably fixed to the stationary cutter bar C which has at its ends mounting arms pivoted at P on the mower frame and held in adjusted positions by the usual adjusting screws A so that the blade S may be properly positioned with respect to the rotary blades B.

The sharpening device comprises an inner section or member 10 and an outer section or member 11 which carries the abrasive element 12. Both of the sections 10 and 11 are preferably made of sheet metal and extend substantially the full length of the stationary cutter blade S. The inner section 10 is a straight channel bar of U-shape in cross section having a flat rectangular web portion 13 with parallel flanges 14 extending from its longitudinal edges. The flanges 14 are shown as of the same width but one may be wider than the other. Either of the flanges may be engaged with the front or outer longitudinal edge of the cutter blade S, as shown in Fig. 1 while the other flange rests on the top of said blade. That positions the flat central or web portion 13 at an angle to flat bottom of the blade S.

The outer section 11 is adapted to be telescoped over the section 10 and the blade S, as seen in Fig. 1, to frictionally hold the device on the blade. The section 11 comprises an upper portion 15 which carries the abrasive element 12, a lower portion 16 and a connecting portion 17. As above indicated this section is preferably formed from a single sheet of thin gage metal having some resiliency so that when it is telescoped over the blade S and the section 10 thereon the parts will be frictionally and yieldably retained on the stationary cutter. The lower portion or plate 16 is normally disposed at a slight angle to the upper portion or plate 15 to facilitate the application of the clamping section 11 but as the latter is forced to its final position, shown in Fig. 1, with the inner face of the connecting wall or portion 17 against the flange 14 engaged with the blade S, the lower plate 16 will spring downwardly since the parts 10 and S will be wedged into the space or channel between the parts 15, 16.

The abrasive element 12 is in the form of a molded strip or block of emery, Carborundum or similar abrasive material held by a suitable binder, and covers the entire rectangular upper face of the upper plate 15. The abrasive block or stone is preferably about three quarters of an inch in width and must be relatively thin because of the limited separation of the blade S from the blades B. It is preferably made an eighth of an inch thick and in order to strengthen it, I preferably mount it in a metal pan or casing. The latter may be formed by cutting and bending the sheet of metal from which the section 11 is formed. The top of the upper portion or plate 15 forms the bottom of the protecting pan, the latter having upwardly bent end walls 18, an upwardly bent rear side wall 19 and an upwardly bent front side wall 20, the latter connecting the upper edge of the wall 17 to the forward edge of the plate 15. If desired the block 12 may be molded in the pan and may have its top flush with the upper edges of the pan, but it may extend slightly above the top of the pan and may be fastened therein in any suitable manner.

When the device is to be used it is only necessary to adjust the screws A to move the cutter S away from the rotary blades B, then hook one flange 14 of the inner positioning section 10 over the free edge of the stationary blade and to then press the outer section 11 over the section 10 and the blade S. The device will thus be frictionally and resiliently held on the stationary cutter so that when the mower is pushed forwardly over a side walk or level ground the rotary blades of the reel will move in the direction of the arrow in Fig. 1 and wipe over the exposed upper face of the grinding stone or block 12. The screws A may of course have to be slightly adjusted to grind or sharpen the rotary blades to the necessary extent. It will be noted that the direction of rotation of the reel blades tends to keep the device in proper position on the stationary cutter. After the sharpening operation the device may be simply pulled off of the stationary blade and the latter is then adjusted into proper grass cutting relation to the reel. Since the rectangular abrasive stone or block is held by the two sections in parallel relation to the stationary cutter blade, the sharpened edges of the reel blades will be uniformly cut to give a true and proper cutting action when the stationary cutter is reset after the grinding operation. The abrasive stone or block is not only relatively inexpensive but highly effective in sharpening the reel blades, and will give the device a long life since it may be repeatedly used. By mounting the thin abrasive block in its protecting and strengthening pan and constructing the two sections from thin sheet steel, it is possible to use the sharpening device in the very restricted space between the reel blades and the stationary cutter on practically all of the reel type mowers now on the market.

While in the foregoing I have indicated a preference for sheet steel in making the two sections of the device, it is to be understood that they may be made of any suitable materials such as aluminum, galvanized iron, plastics, etc. The grit or abrasive material in the block 12 may be aluminum oxide or any suitable abrasive.

From the foregoing, taken in connection with the accompanying drawings, it will be seen that novel and advantageous provisions has been made for carrying out the objects of the invention, and while preferences have been disclosed, attention is invited to the possibility of making variations within the scope of the invention as claimed.

I claim:

1. A device for sharpening the cutter blades of a rotary reel of a lawn mower and for insertion between the reel blades and the coacting stationary cutter bar when the latter is adjusted away from the reel, comprising separable inner and outer sections, each substantially coextensive in length with the cutter bar, the inner section being supported on top of the cutter bar and having at its front edge a stop portion to engage the front edge of the cutter bar, said inner section having a flat top disposed in downwardly and forwardly converging relation to the plane of the cutter bar, said outer section having top and bottom plates resiliently connected along their forward longitudinal edges, said top plate being disposed in supporting and frictional contact with said top of the inner section and said bottom plate being disposed in yieldable and frictional contact with the bottom of said cutter bar, and a substantially rectangular block of abrasive material carried on the top of said upper plate for engagement by the cutting edges of the reel blades.

2. The structure of claim 1 in which said inner section is formed by a straight strip of sheet material of channel shape in cross section and having downwardly projecting substantially parallel flanges along its flat web portion, the latter forming the top of said inner section, one of said flanges being engageable with the forward edge of the cutter bar to form said stop portion and the other flange being engageable with the top of said cutter bar to support the inner section in converging relation to the plane of the cutter bar.

3. The structure of claim 1 in which said outer section is formed of resilient material and said upper plate is formed with an upwardly open substantially rectangular pan to receive and protect said abrasive block on said outer section.

4. The structure of claim 3 in which said material is a single piece of resilient sheet metal having portions bent to form the parts of said outer section and its block protecting pan.

5. The structure of claim 1 in which said inner section is a straight strip of channel metal and said outer section formed by a single piece of resilient sheet metal.

ROBERT B. HOUSLEY.

No references cited.